Figure 1:
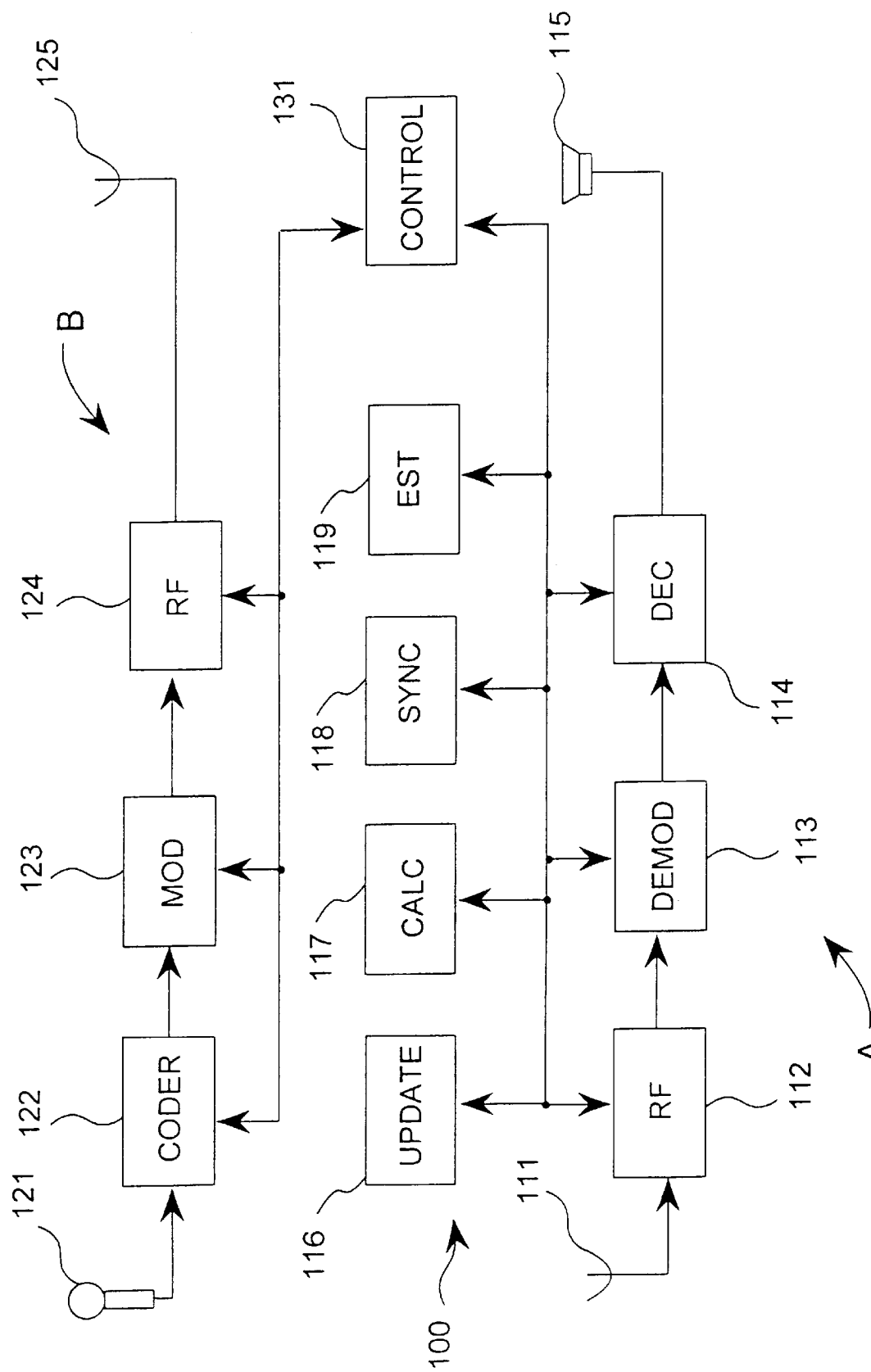

United States Patent [19]

Saario et al.

[11] Patent Number: 6,112,104
[45] Date of Patent: Aug. 29, 2000

[54] METHOD FOR CONTROLLING TRANSMISSION OF A PILOT SIGNAL BASED ON LOAD MEASUREMENTS AND CELLULAR RADIO SYSTEM OPERATING ACCORDING TO SUCH METHOD

[75] Inventors: Eija Saario; Anu Virtanen, both of Helsinki, Finland

[73] Assignee: Nokia Telecommunications Oy, Espoo, Finland

[21] Appl. No.: 09/011,768

[22] PCT Filed: Jun. 18, 1997

[86] PCT No.: PCT/FI97/00389

§ 371 Date: Feb. 17, 1998

§ 102(e) Date: Feb. 17, 1998

[87] PCT Pub. No.: WO97/49195

PCT Pub. Date: Dec. 24, 1997

[30] Foreign Application Priority Data

Jun. 19, 1996 [FI] Finland ..................................... 962563

[51] Int. Cl.[7] ..................................................... H04Q 7/30
[52] U.S. Cl. ........................... 455/561; 455/522; 370/335
[58] Field of Search ................................... 455/422, 436, 455/442, 443, 453, 561, 522; 370/342, 320, 335

[56] References Cited

U.S. PATENT DOCUMENTS

| | | | |
|---|---|---|---|
| 5,109,390 | 4/1992 | Gilhousen et al. | ...................... 455/561 |
| 5,548,812 | 8/1996 | Padovani et al. | ........................ 455/442 |
| 5,754,542 | 5/1998 | Ault et al. | ................................ 370/342 |
| 5,884,187 | 3/1999 | Ziv et al. | ................................. 455/453 |
| 5,912,884 | 6/1999 | Park et al. | .............................. 455/453 |
| 5,966,670 | 10/1999 | Keskitalo et al. | ....................... 455/562 |

FOREIGN PATENT DOCUMENTS

| | | |
|---|---|---|
| 564 937 | 10/1993 | European Pat. Off. . |
| 615 395 | 9/1994 | European Pat. Off. . |
| 674 451 | 9/1995 | European Pat. Off. . |
| 96/16524 | 5/1996 | WIPO . |

*Primary Examiner*—Edward F. Urban
*Attorney, Agent, or Firm*—Pillsbury Madison & Sutro

[57] ABSTRACT

A method and system for transmitting a pilot signal in a cellular radio system which includes a plurality of subscriber terminal equipments and at least one base station, each subscriber terminal equipment being connectable to the base station via a channel, the base station transmitting a pilot signal that is receivable by the subscriber terminal equipments, a load being formed at least by the subscriber terminal equipments that are presently connected to the base station, and each subscriber terminal equipment that is connected to the base station having an active group list that includes the base station. The load in the system is measured to produce a measured load result; and transmission of the pilot signal is halted at least periodically when the measured load result is greater than a set limit value.

19 Claims, 2 Drawing Sheets

METHOD FOR CONTROLLING TRANSMISSION OF A PILOT SIGNAL BASED ON LOAD MEASUREMENTS AND CELLULAR RADIO SYSTEM OPERATING ACCORDING TO SUCH METHOD

This application is the national phase of international application PCT/FI97/00389 filed Jun. 18, 1997 which designated the U.S.

The present invention relates to a method for transmitting a pilot signal used in a cellular radio system including subscriber terminal equipments and at least one base station where the load is formed at least of the connections of the subscriber terminal equipments to the base station which transmits a pilot signal intended for the subscriber terminal equipments, which subscriber terminal equipments are connected to the base station via channels, which base station is included in an active group list of the subscriber terminal equipment.

The present invention is suitable to be used in radio systems employing Code Division Multiple Access use, i.e. the CDMA technique, and especially in so-called WLL systems (WLL=Wireless Local Loop). The code division multiple access use is a multiple use method based on a spread spectrum technique which has recently been applied to cellular radio systems together with previous FDMA (FDMA=Frequency Division Multiple Access) and TDMA (TDMA=Time Division Multiple Access). CDMA has several advantages in comparison with previous method, such as spectrum efficiency and the simplicity of frequency planning.

In the CDMA system, each base station transmits continuously a pilot signal in such a manner that different sectors or beams of the base station have a specified pilot signal because each sector and beam has a specific base station transceiver unit. It is previously known to use a pilot signal for identifying a base station, beam or sector of the base station. A pilot signal is a spread-coded signal without data modulation which signal each base station transmits continuously to its coverage area. The terminal equipment may identify the base station transceiver units by the pilot signal because the phases of the spreading codes in the pilot signal differ from one another. The subscriber terminal equipments carry out measurements of pilot signals continuously and the subscriber terminal equipments form an active group of the base station transceiver units that provide the best connections, the base station transceiver units included in the group being utilized when new connections are established.

WLL systems are radio systems where a mobile telephone system is used to replace an ordinary wired telephone network. In the WLL system, subscriber terminal equipments are fixedly installed at the user's premises in the similar way as ordinary telephones. In other words, terminal equipments in the WLL system have a wireless subscriber connection to the public switched telephone network, i.e. to the PSTN.

All data transmission systems utilizing a radio channel have disturbances on the radio path, such as multipath fadings of a signal which are caused by a signal that has propagated via different ways to be summed in the receiver. As in the WLL system both the transmitter and the receiver are stationary, multipath fading is caused by the movement of objects in the environment. Thus fading is very slow from the point of view of radio engineering. A fading period generally varies from one second to some seconds. Fading depths may be so significant that they have an effect on the quality of the connection if the subscriber terminal equipment is situated in the boundary area of two cells, for instance.

EP 0564 937 discloses a radio system comprising a base station and several subscriber terminal equipments. The base station comprises means for transmitting a pilot signal and means for establishing a connection on the traffic channel between the base station and the subscriber terminal equipment to the subscriber terminal equipment. The subscriber terminal equipment as described in the reference cited comprises means for detecting the pilot signal and means for determining the difference between the pilot signal transmitted by the base station and the pilot signal received by the subscriber terminal equipment. Furthermore, the subscriber terminal equipment comprises means for storing the pilot signal and the traffic channel signal it has received for compensating disturbance in the traffic channel.

There have, however, been problems in prior art solutions. In known solutions, every base station transmits a pilot signal. The pilot signal is transmitted at a considerably higher transmission power than the actual traffic channel. The transmission power can be e.g. 5 dB higher than the transmission power of the traffic channel. The high transmission power of the pilot signal causes disturbances to the traffic channels of the cellular radio network. Pilot signals cause disturbances especially in WLL systems where cells are small. The use of a pilot signal also uses a rather great amount of network capacity.

The purpose of the present invention is to accomplish a solution where a pilot signal is transmitted in such a manner that the transmission of a pilot signal will cause as little disturbance as possible.

This will be attained with the method as shown in the preamble that is characterized in that in the method the load of the cellular radio network is measured and on the basis of the obtained measurement result, the transmission of the pilot signal is controlled.

The invention also relates to a cellular radio system comprising several subscriber terminal equipments, at least one base station and transmission means for transmitting a pilot signal intended for the subscriber terminal equipments, which subscriber terminal equipments are connected via channels to the base stations, in which cellular radio system the load is formed at least of the connections of the subscriber terminal equipments to the base station, which base stations belong to an active group list of the subscriber terminal equipment.

The radio system of the invention is characterized in that the cellular radio system comprises measurement means for measuring the load of the cellular radio network and control means for controlling the transmission of the pilot signal by the transmission means on the basis of information obtained from the measurement of the load.

The solution of the invention has several advantages. In the solution of the invention, a pilot signal is transmitted in such a manner that it causes as few disturbances as possible. In the present solution, a pilot signal is not transmitted continuously. In the solution, the subscriber terminal equipment updates its active group list on the basis of the pilot signal received by it if there have been changes in the configuration of the cellular radio network. Furthermore, the initial power used in the transmission of the subscriber terminal equipment is calculated in advance, in which case the transmission power of the subscriber terminal equipment is approximately right. In this way it is possible to decrease the transmission of power adjustment commands. As a pilot signal is not transmitted continuously, the subscriber terminal equipment can be synchronized with the base station by means of the synchronization channel. In the solution, the channel between the base station and the subscriber terminal equipment is estimated and demodulated as required by means of reference symbols. These reference symbols are added to the signal when the connection between the base station and the subscriber terminal equipment weakens. The disturbance power can be minimized and the capacity of the system can be increased by the use of reference symbols.

Figure 2:
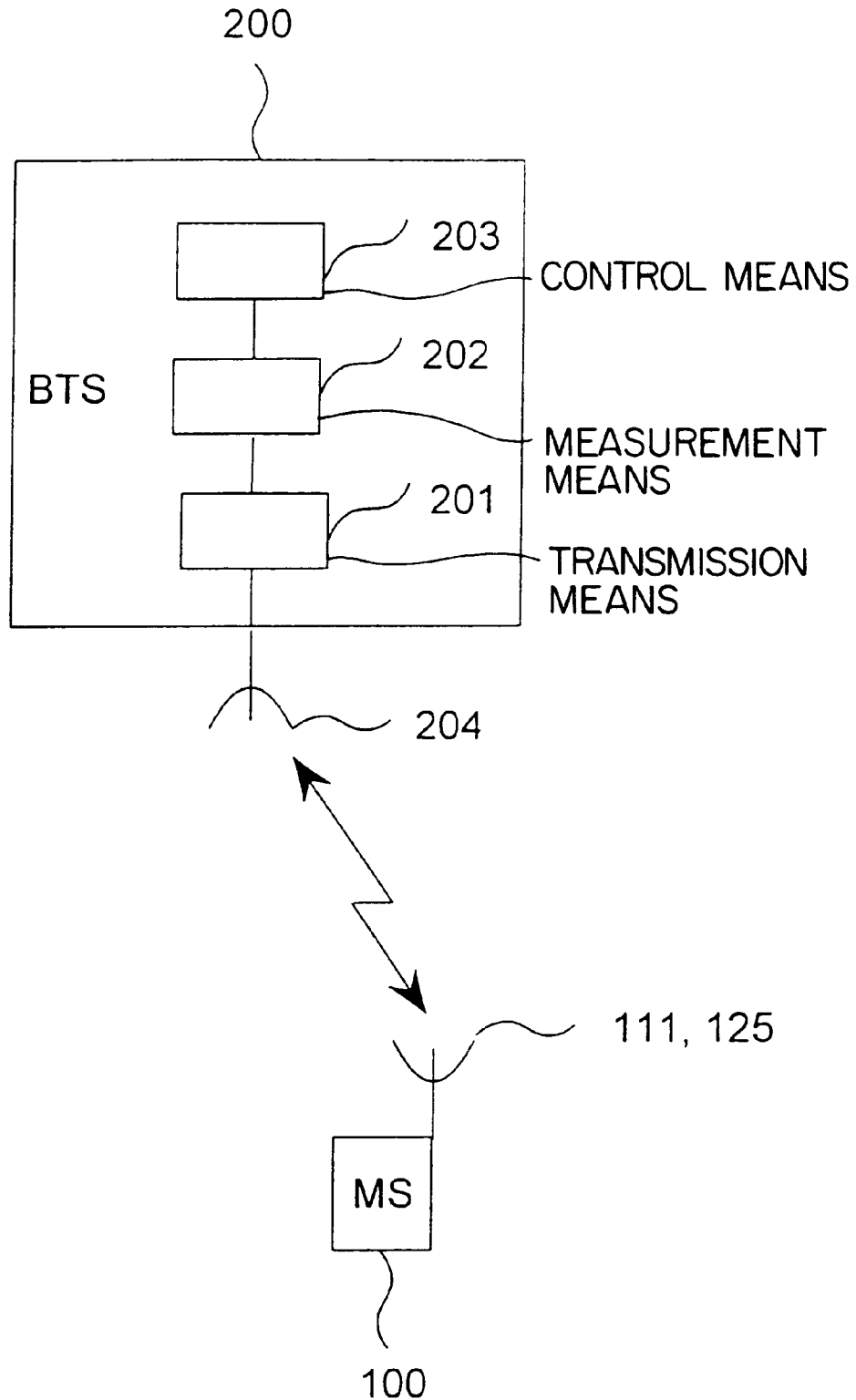

In the following, the invention will be explained in more detail with reference to the examples of the appended drawings, wherein FIG. 1 shows a subscriber terminal equipment of the invention, and FIG. 2 shows a cellular radio system of the invention.

FIG. 1 shows a subscriber terminal equipment 100 of the invention in its essential parts. The subscriber terminal equipment 100 comprises a receiver part A and a transmitter part B. The receiver part A comprises an antenna 111, radio frequency parts 112, a demodulator 113, a decoder 114 and a handset 115. The transmitter part B comprises a microphone 121, a coder 122, a modulator 123, radio frequency parts 124 and an antenna 125. The terminal equipment 100 further comprises control means 131 which are common to both the receiver part A and the transmitter part B. The subscriber terminal equipment 100 also comprises means 16, calculation means 117, synchronization means 118 and estimation means 119.

FIG. 2 shows a cellular radio system to be explained in the following on the basis of the CDMA technique, without restricting the invention thereto. The cellular radio system as described in the figure comprises a base station 200 and a set of subscriber terminal equipments 100. The base station 200 comprises an antenna 204 by which a signal is transmitted and received. The base station 200 also comprises transmission means 201 for transmitting a pilot signal. The base station 200 further comprises measurement means 202 and control means 203. The control means 203 are adjusted to control the transmission means 201. The measurement means 202 are adjusted to measure the load situation of the cellular radio system.

The receiver part A of FIG. 1 operates in the following way. A radio frequency analog signal transmitted from the antenna 111 by the radio frequency parts 112 is transferred to an intermediate frequency and it is filtered. The demodulator 113 restores the broadband signal into a narrowband data signal. The data signal is decoded in a suitable way by the decoder 114. The decoder 114 decodes a typically convolution-encoded signal and the operation of the decoder 114 is based on the Viterbi algorithm, for example. Generally, the decoder 114 also de-encrypts and de-interleaves the pre-processed signal. From the decoder 114 the signal is further carried to the handset 115.

The means 116 update the active group list of the subscriber terminal equipment 100. It is not necessary to update the active list when the subscriber terminal equipment 100 is connected to the base station 200. The means 116 are arranged to update the active list when the load of the cellular radio network is low. Network loading can be equalized in this way. The calculation means 117 calculate and set for the subscriber terminal equipment 100 in advance a suitable initial power which is used when establishing a connection. In this way the power consumption of the subscriber terminal equipment 100 can be reduced. By means of the synchronization means 118, the subscriber terminal equipment 100 is synchronized with the synchronization channel of the base station 100 and the subscriber terminal equipment 100 in place of the pilot signal.

The estimation means 119 of the subscriber terminal equipment 100 estimate and carry out a coherent demodulation of the channel. The estimation and demodulation are carried out by means of reference symbols. By using reference symbols, the disturbance power will be minimized and the capacity of the network can be increased at the same time. Reference symbols are added amidst a signal that establishes a downlink connection between the base station 200 and the subscriber terminal equipment 100. The frequency of adding reference symbols is raised temporarily if the quality of the connection weakens. The reference symbol frequency is determined for example so that the reference symbol frequency is proportional to the Doppler deviation of the channel.

The transmitter part B operates in the following way. The microphone 121 receives an audio signal and transmit an electrical counterpart of the signal to the coder 122. The coder 122 convolution-encodes and typically encrypts the signal. The coder 122 also interleaves the bits or bit groups of the signal. The convolution-encoded narrowband signal is pseudo-noise-encoded into a broadband spread-spectrum signal in a modulator 123. After this, the spread-spectrum signal is converted into radio frequency according to prior art in the radio frequency parts 124 and transmitted via the antenna 125 to the radio path.

The control means 131 control the operation of both the receiver part A and the transmitter part B. The antennas 111 and 125 are transmitting and receiving antennas as in prior art radio systems. The operations of the transmitting and receiving antenna 111 and 125 are in practice combined to the same antenna. The microphone 121, the handset 115, the radio frequency parts 112 and 124 are also prior art parts used in known radio systems.

In the cellular radio system of FIG. 2, the subscriber terminal equipment 100 is connected by means of the base stations 200 to other subscriber terminal equipments 100. The base stations 200 that are connected to the subscriber terminal equipment 100 form the active group of the subscriber terminal equipment 100. The subscriber terminal equipment 100 stores information about the base stations 200 in the active group into an active group list.

The means 116 included in the subscriber terminal equipment 100 update the active group list of the subscriber terminal equipment 100. The means 116 update the active list when the load of the cellular radio network is low. When the subscriber terminal equipment 100 is establishing a connection via the base station 200 to another subscriber terminal equipment 100, the initial power used by the subscriber terminal equipment 100 in the transmission is calculated in advance. The initial power is calculated in the calculation means 117 that set for the subscriber terminal equipment 100 in advance a suitable initial power used when establishing a connection. The estimation means estimate and carry out a coherent demodulation of the channel by means of reference symbols instead of the pilot signal. Reference symbols are added amidst data symbols which establish a downlink connection of the base station 200 and the subscriber terminal equipment 100, in which case the capacity of the network can be increased.

In the following, an example is given of the increase in the capacity of the network achieved by reference symbols. It is assumed in the example that the distance between the reference symbols is about 10% of the coherence time $t_d$ of the channel between the base station 200 and the subscriber terminal equipment 100. The coherence time $t_d$ of the channel is determined by the formula:

$$t_d = 1/B$$

In the formula, the Doppler deviation is indicated by B. It can be seen in the formula that when the Doppler deviation reduces, the coherence time increases. It follows from this that in a static WLL channel, the reference symbol frequency can be considerably smaller than in a moving mobile channel. In a static WLL channel, the Doppler deviation is some hertz, but in a mobile channel, the Doppler deviation is hundreds of hertz. In a network where the subscribers are stationary, the reference symbol frequency can be reduced in comparison to a network where the subscribers are moving. If the reference symbol frequency is reduced, the capacity of the network can be saved.

In FIG. 2, the measurement means 202 of the base station 200 measure the load of the cellular radio network. The load of the cellular radio network is formed at least of the connections of the subscriber terminal equipments 100 to the base station 200. The other equipments in the network also load the network. The control means 203 of the base station 200 are connected to the measurement means 202. The control means 203 are arranged to obtain measurement data proportional to the load of the cellular radio network. The control means 203 are arranged to control the transmission means 201 of the base station that transmit the pilot signal. The control of the transmission means 201 is thus based on the load measurement of the network by the measurement means 202.

The transmission means 201 of the base station 200 transmit a pilot signal to the subscriber terminal equipments 100. The transmission of the pilot signal is not, however, continuous but the pilot signal is transmitted on the basis of the load measurements of the network by the measurement means 202. The information about the load measured by the measurement means 202 is carried to the control means 203 that control the transmission means 201. The control means 203 are arranged to instruct the transmission means 201 to transmit a pilot signal when the load of the network measured by the measurement means 202 is small. If the load of the network measured by the measurement means 202 is great, the information about the load is carried to the control means 203 that control the transmission means 201. The transmission means 201 do not transmit a pilot signal in the situation mentioned above. The disturbance caused by the pilot signal is also reduced in such a manner that the base stations 200 transmit a pilot signal less often at different times.

Although the invention has been explained above with reference to the example of the appended drawings, it is evident that the invention is not restricted thereto, but it can be modified in various ways within the scope of the inventive idea disclosed in the accompanying claims.

What is claimed is:

1. A cellular radio system comprising several subscriber terminal equipments (100), at least one base station (200) and transmission means (201) for transmitting a pilot signal intended for the subscriber terminal equipments (100), which subscriber terminal equipments (100) are connected via channels to the base stations (200), in which cellular radio system the load is formed at least of the connections of the subscriber terminal equipments (100) to the base station (200), which base stations (200) belong to an active group list of the subscriber terminal equipment (100), wherein the cellular radio system comprises measurement means (202) for measuring the load of the cellular radio system, control means (203) for controlling the transmission of the pilot signal by the transmission means (201) on the basis of the measurement result obtained from the measurement of the load in such a manner that the transmission means (201) transmit the pilot signal when the load result is smaller than a pre-set limit value of the load, the transmission means (201) transmit the pilot signal less often or the transmission of the pilot signal is prevented when the load result is greater than the set limit value.

2. A cellular radio system according to claim 1, wherein the transmission means (201) are arranged to transmit the pilot signal if the load of the cellular radio system is low.

3. A cellular radio system according to claim 1, wherein the transmission means (201) transmit the pilot signal less often or the transmission of the signal is prevented if the measured load of the cellular radio system is great.

4. A cellular radio system according to claim 1, wherein the cellular radio system comprises means (116) for updating the active group list of the subscriber terminal equipment (100) on the basis of the pilot signal.

5. A cellular radio system according to claim 4, wherein the means for updating (116) are arranged to update the active group list if there are changes in the number of connections of the subscriber terminal equipments (100) and the base station (200).

6. A cellular radio system according to claim 4, wherein the cellular radio system comprises estimation means (119) for estimating and demodulating the channel between the subscriber terminal equipment (100) and the base station (200) as required by means of symbols previously known to the base station (200) and the subscriber terminal equipment (100).

7. A cellular radio system according to claim 6, wherein the estimation means (119) are arranged to add symbols when the connection between the base station (200) and the subscriber terminal equipment (100) weakens.

8. A cellular radio system according to claim 6, wherein the estimation means (119) are arranged to transmit symbols at different transmission powers.

9. A cellular radio system according to claim 1, wherein the cellular radio system comprises calculation means (117) for calculating in advance from the pilot signal the initial power of the subscriber terminal equipment (100).

10. A cellular radio system according to claim 1, wherein the measurement means (202) and the control means (203) are at the base station (200).

11. A cellular radio system according to claim 1, wherein the cellular radio system is a CDMA system where the subscriber terminal equipments (100) are situated at previously known locations.

12. A method for transmitting a pilot signal in a cellular radio system which includes a plurality of subscriber terminal equipments and at least one base station, each subscriber terminal equipment being connectable to the base station via a channel, the base station transmitting a pilot signal that is receivable by the subscriber terminal equipments, a load being formed at least by the subscriber terminal equipments that are presently connected to the base station, and each subscriber terminal equipment that is connected to the base station having an active group list that includes the base station, said method comprising:

measuring the load to produce a measured load result; and halting transmission of the pilot signal at least periodically when the measured load result is greater than a set limit value.

13. The method according to claim 12 further comprising transmitting the pilot signal when the measured load result is less than a set limit value.

14. The method according to claim 12 wherein the measured load result is greater than the set value when the load is great.

15. The method of claim 12 further comprising calculating a suitable initial transmission power for each subscriber terminal equipment.

16. The method according to claim 12 further comprising estimating the channel between a subscriber terminal equipment and the base station by transmission of symbols that are known to the subscriber terminal equipment and the base station.

17. The method according to claim 16 wherein the symbols are transmitted when the connection between the base station and the subscriber terminal equipment weakens.

18. The method according to claim 16 wherein the transmission of the symbols occurs at varying power levels.

19. The method according to claim 12 wherein each subscriber terminal equipment is at a known location.

* * * * *